Fig. 1

3,817,737
SHAPING ROTATING HOLLOW BODIES OF THERMOPLASTIC MATERIALS WITH FLUID JETS
Francois Maurice Hennequin, Le Vesinet, France, assignor to Compagnie de Saint-Gobain, Neuilly-sur-Seine, France
Original application Dec. 17, 1969, Ser. No. 885,935, now Patent No. 3,694,178. Divided and this application May 8, 1972, Ser. No. 251,416
Claims priority, application France, Dec. 17, 1968, 178,618; June 18, 1969, 6920315
Int. Cl. C03b 9/14
U.S. Cl. 65—262   7 Claims

ABSTRACT OF THE DISCLOSURE

Thermoplastic material such as glass is shaped as a paste or parison having an entry for blowing. It is internally blown while its outer surface is shaped by successive effects of local gaseous counterpressures accompanied by heat.

---

This application is a division of Ser. No. 885,935, filed Dec. 17, 1969, now U.S. Pat. No. 3,694,178.

The object of the present invention is a new process of shaping hollow bodies of thermoplastic materials. In this new process, unlike classical processes, the shape of the object is not given by one or several metallic molds constituting at the same time cooling means, but it is defined by the intervention of shaping organs successively exercising localized counter-pressures.

If one excepts certain processes of a special nature such as those that permit the manufacture, for example, of television tubes or certain forms of tubular products, the manufacture of hollow objects of thermoplastic materials, such as glass, entails three principal processes.

Articles of simple form, such a culinary glassware, are usually shaped by simply pressing a parison of melted glass between a matrix and a die. However, when the shape becomes hollower and more complex, it is necessary to operate in at least two stages. In the "pressed-blown" process, a rough is first formed by pressing, then the final form is obtained by blowing in a finishing mold; this process makes it possible to obtain objects with a rather large neck, such as industrial vessels. For the manufacture of flasks or bottles, one ordinarily has recourse to the "blown-blown" process wherein the parison is injected into a mold in which it is formed into a prerough by formation of the ring at the lower part, the orifice constituting an entry for blowing. The mold is then completed by a base mold, and the prerough is transformed into a rough by blowing in the roughing mold thus constituted. The rough is turned over, suspended by its ring and finished to a final form by a second blowing in a finishing mold.

The process of the invention likewise has recourse to a first phase consisting in shaping, by any known means, a prerough provided with a mold ring and an entry for blowing from an individual parison, including a flat ribbon as in certain processes permitting the manufacture of articles with a rather wide neck. It would even be possible to start with a more elaborate rough analogous to those obtained in the pressed-blown or blown-blown processes.

But the invention is characterized essentially by the rest of the operation. This has recourse to a shaping of a nature entirely different from that of the usual processes. In this shaping which is effected by blowing the prerough held in a ring mold, the shape is progressively formed by passage through external shapers provided by parts that generate gaseous cushions. The fluids from these parts or shapers may, in the classical manner, be any gas, air, steam, or even vapor.

It is very important to be able to act on the thermal state both along the surfaces and in depth, to obtain the desired result in the final form, in the spreading of the thickness of the walls and in obtaining the desired treatments, particularly thermal treatments. The gaseous cushions have such a thermal effect that their nature and their arrangement must take this into account. But their role is essentially mechanical and the thermal effect is only secondary.

The thermal state of the glass, during and at the end of the shaping, will thus advantageously be adjusted by special parts using, separately or simultaneously, radiant walls, hot or cold, gases, radiant or otherwise, electric or electromagnetic effects.

Thus, in the course of the manufacture of the article by internal blowing, the deformation of the wall of the rough is changed when it arrives in the region of the shapers, so that the article progressively attains its final form while stretching along these parts, without the "skin" being fixed on contact with them, as happens in ordinary molding processes. The process of the invention thus consists essentially in combining with the internal blowing of the article being shaped the successive external effects of localized gaseous counter-pressures, of a determined effect, associated with suitable thermal effects. For example, in the working zones, the wall maintained from the outside by the counter-pressures must be sufficiently soft so that the deformation of the glass may continue until the desired shape and distribution of the material is obtained. In other regions, on the other hand, it may be necessary to cool, in certain stages of the operation, in order to limit deformation. The invention is advantageously applied with the aid of a collection of shapers including blowing parts giving rise to gaseous cushions, and temperature-regulating parts. The apparatus used will advantageously take the form of ranks of generating parts, separated by heat-regulating parts. It will be noted that the lower part of the parison may if desired be maintained during the operation by a means that does not necessarily utilize a gaseous cushion, the rough remaining suspended from the ring mold.

According to another characteristic that has the effect of keeping the effect of the gaseous cushion uniform and, particularly, avoiding the hammering effect that would be caused by too local and strong an effect of the fluid on the surface of the glass, the shapers and the article to be shaped are in relative motion tangentially along their zone of contact. A method that is particularly advantageous consists in arranging the gaseous cushions in lines having a suitable profile, thus giving rise, by virtue of the relative movement, to a virtual mold which in general is progressively deformed according to the progressive development of these lines to give the rough desired successive shapes in order to approach progressively the desired final form. The contact lines may comprise a system of parallels or, better, generators of the rough being manufactured without enclosing the latter in the manner of a mold. The shapers permit a complete shaping because all the regions of the surface being shaped come before them in turn, so long as the rate of passage is sufficient so that the deformation resulting from the internal blowing is limited between two successive passages. At the same time the heat regulators act on the viscosity of the mass of the glass to adjust its ability to be drawn or bent.

For example, one may, after having formed the ring and the blowing entry by molding, turn the prerough around a fixed axis while it is being blown by operating shapers including parts that generate gaseous cushions and heat regulators which have essentially a radial trajectory that permits them to approach and recede from the axis of rotation to act in the desired manner on the surface being worked. This rotation could even be replaced by that of the whole shaping apparatus.

It is interesting to note that weight and possible centrifugal force contribute to shaping of the article by the major effect, which is that of internal blowing; the local effect of the gaseous cushions is of the greatest importance to obtain the shape and regularity desired.

If, by way of explanation, one refers to the manufacture of the turned articles that comprise the greater part of glass products in current use, an advantageous embodiment consists in using a ring mold to turn the article in front of the shapers. The distance of each of these parts from the axis of the device may then remain fixed, while the wall "applies itself" progressively to the surface they form. But the latter may also be detached in stages or displaced progressively in a radial direction, accompanying the swelling of at least a part of the rough while it is being blown to attain the final form.

The function of the gaseous cushions is essentially dynamic. But the generators cannot be just any blowing orifices. They are analogous in principle to the parts that are usually used to form gaseous cushions for the manufacture of glass ribbon such as those described for example by the applicant in French Pats. 1,414,887, 1,477,516 and its supplement 91,499, 1,510,085, 1,527,937 or in French application 69/17,523 of May 27, 1969. Such parts comprise a system of blowing orifices more or less independent, of a structure, dimensions and forms that are very variable, fed by narrow orifices. The surface to be shaped closes the outlet of the blowing orifices so that the counter-pressure exerted varies very rapidly with the distance. One may thus consider that the gaseous cushion has a fixed range, that is to say that its effect is exerted not only on a given surface but at a short, well-defined distance from the external face of the generator.

According to known ideas in the domain of flat glass, the precision of the final shaping depends on the range of the generating parts, that is, on the distance at which the counter-pressure ceases to have an effective action and on the rapidity of effect of the cushion—characteristics that it may be advantageous to vary during the shaping. It will be easily understood that it is possible to constitute the generating parts of slits with perpendicular or oblique jets or of separate pieces with evacuation spaces between them, at least from place to place, the succession of which progressively gives the rough its final form. In regions where reheating is necessary, the blowing orifices may of course be burners.

However, the apparatus used within the limits of the invention, though they play a more important corrective role, require less precision, particularly at the beginning of the operation, and since in most cases, they operate along a quite narrow band across which it is not generally indispensable to obtain a profile of uniform pressure, their conception may be simplified in consequence. It is above all possible to use elements with a porous surface.

If, according to a very advantageous solution, one has recourse to lines of contiguous parts, if desired oblique ones, the profile of the transverse sections may present a staircase form which it is possible to modify within certain limits to vary the form of the finished article. It is then very important that the pieces composing the steps of this staircase be of small dimensions; by staggering the successive rows of pieces or arranging them in fives, it is thus possible to give the surface of the object a continuous profile.

In a particularly advantageous version, the prerough is turned around the axis of the sleeve on which it is suspended, while blowing it interiorly, at the same time that it is made to proceed with a preferably horizontal and rectilinear movement in the zone of action of a set of shapers exercising complementary counterpressures and thermal effects.

According to another characteristic of the invention, the shapers are spaced along the course followed by the prerough so that their action effects the progressive swelling of the prerough by making it approach little by little the profile of the hollow body to be produced.

According to another characteristic of this application, the shapers are positioned transversely and/or angularly with respect to the trajectory followed by the rough, either to modify the successive profiles when it is desired to change the model or simply to effect the adjustments necessary for the prefectioning of a given product.

In the following explanation we shall refer to the manufacture of "round bottles," but it is to be understood that this embodiment applies to all round revolving bodies and may extend to forms having a less exact symmetry, such as cycloidal forms.

An apparatus for carrying out the process according to the invention comprises a chain of which a straight run having a uniform movement transports the sleeves supporting the preroughs along the middle of a passage made up of the shapers comprising the parts that generate the gaseous cushions and by heat conditioning parts, both arranged on either side of the path described by the axes of rotation of the sleeves.

The bottle thus rotates between the two walls of the passage on which the shapers are arranged. These walls act first on the portions of the glass which most rapidly approach the final form. The whole of the mechanical effect exercised by the counterpressures along the walls made up of the generating parts and the heat effect which retards or accelerates drawing, forces the rough to progressively take the desired form by opposing the pressure of blowing, the action of which obliges the walls to thin out to obtain the desired thicknesses. The succession of local effects exercised by the successive parts promotes the approach to the form and the increase in viscosity equally so that solidification is obtained rapidly and homogeneously over the whole article, the whole of the wall of which thus attains sufficient rigidity at the moment its shaping is finished.

It is necessary to provide, at least in the final part of the shaping of the roughs, an array of supporting parts. These parts are for the purpose of sustaining the base of the rough, decreasing its elongation from the effect of weight, and giving the base of the bottle its final form progressively.

One may conceive of constituting these supports by fixed-position shapers forming a wall which may be analogous to that formed by the lateral shapers, but, as a general rule, the more or less concave form to be given to the bottom of the bottle makes it necessary, at least at the end of the chain, to provide mobile supports.

These supports are constituted for example by a generator of gaseous cushions of suitable form or by a base turning on a vertical axis in a carrier which proceeds parallel to the chain of ring molds. This carrier is drawn by a chain synchronized with the chain drawing the sleeves, while the height of the base is progressively modified by the action, for example, of a series of inclined cams.

When a turning base is used, it may be mounted free in its support, but it may also if desired accompany the rotation of the sleeve. It may even be used to rotate the bottle instead of this rotation being effected by the sleeve enclosing the ring.

Although the rotation contributes to the stabilization of the rough, it is preferable to give the support a structure which permtis centering the rough or parison at least in the longitudinal direction and to receive it thereon shortly after the beginning of blowing. In the transverse direction, the bottle is stabilized moreover by the presence of the gaseous cushions.

On the other hand, thanks to the possibility of regulating the shapers angularly, it is possible to compensate for minor dyssymetries related to the fact that the speed of rotation is added to the speed of transit along one of the walls, while it is subtracted along the opposite wall.

It is moreover possible to periodically vary the output of gas from the cushion generators so that a given pressure profile accompanies the bottle in transit along the chain.

Generally, the shapers form more or less vertical walls intended to impart to the body of the bottle its elongated form while the bottom shaper progressively descends to let the glass stretch.

It is advantageous for the transverse profile of the passage to develop, preferably progressively, from upstream to downstream of the chain. In the first shaping zones the walls are relatively close, then they are deformed and progressively separate from each other, their surface accompanying the progressive swelling of the rough.

To simplify the manufacture of the equipment by giving simple forms to the successive shapers, it is possible, as has been said, to vary the profile discontinuously.

Certain adjustments of form, particularly at the end of the chain, may require quite high local pressures, either to cause considerable local deformations or, on the contrary, to smooth the whole surface. Effects of this kind may be obtained with cylinders or free rollers, which may be moved at high speed and act through the intermediary of an air film in contact with the surface of the article.

The apparatus of this particular embodiment permits very easy access to the articles during shaping. It is thus possible to install along the chain a large number of observation points for measurements or tests, such as that of temperature.

Such measurements permit automatic compensation of the shaping elements: blowing pressure, counterpressure of the gaseous cushions, position of the gas cushion generators, effect or position of the heat regulators.

Breaking down the shapers into a chain of independent elements moreover permits easy and very rapid modification of these elements when it is desired to change the manufacturing model, which is a considerable advantage over classical methods of manufacture.

It is to be noted that one of the elements of the chain may be lengthened, which permits carrying out without change secondary operations such as reheating or various treatments.

Other characteristics and advantages of the invention will be clear from the following description which relates to two embodiments of apparatus according to the invention, given only as nonlimiting examples in connection with the accompanying drawing, wherein:

FIGS. 7 is a detail sectional view taken in planes identified by the broken line VII–VII, FIG. 6.

Figure 1:
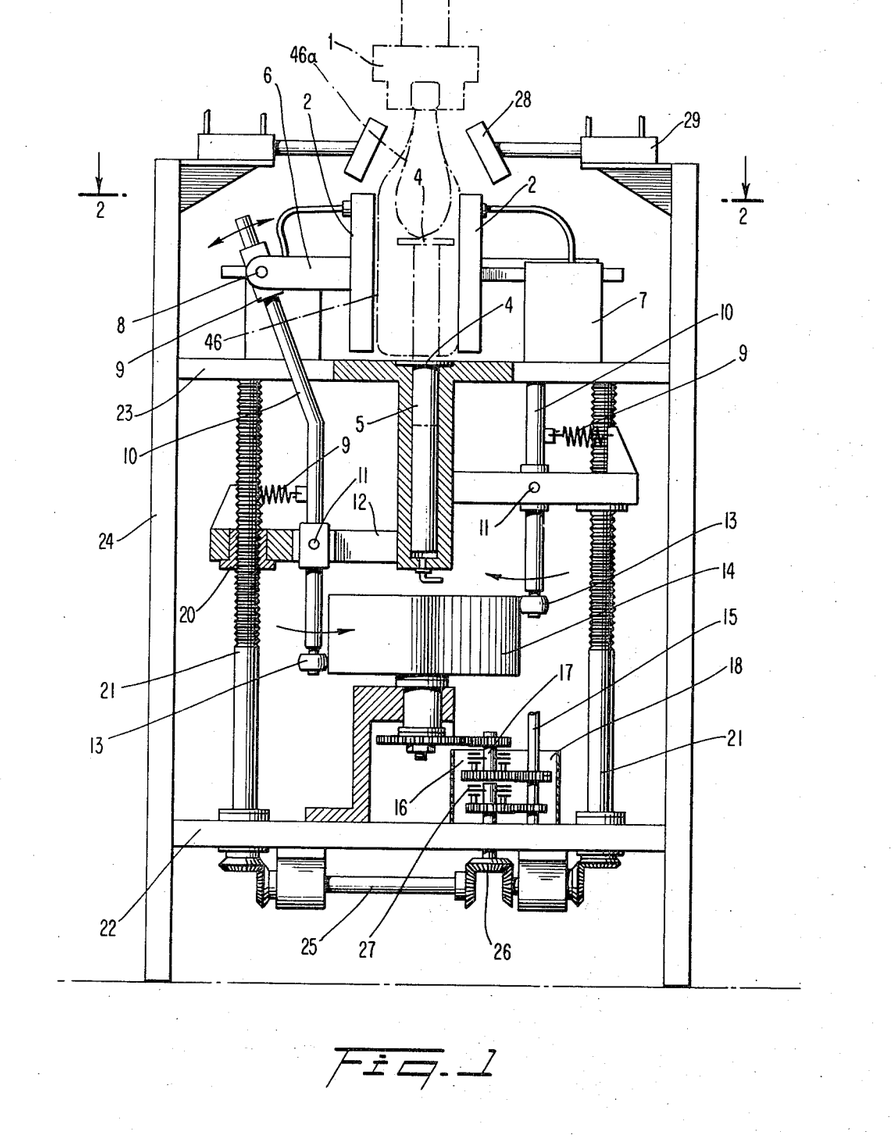
FIG. 1 is an elevational view, partly in section, of a first embodiment.
Figure 2:
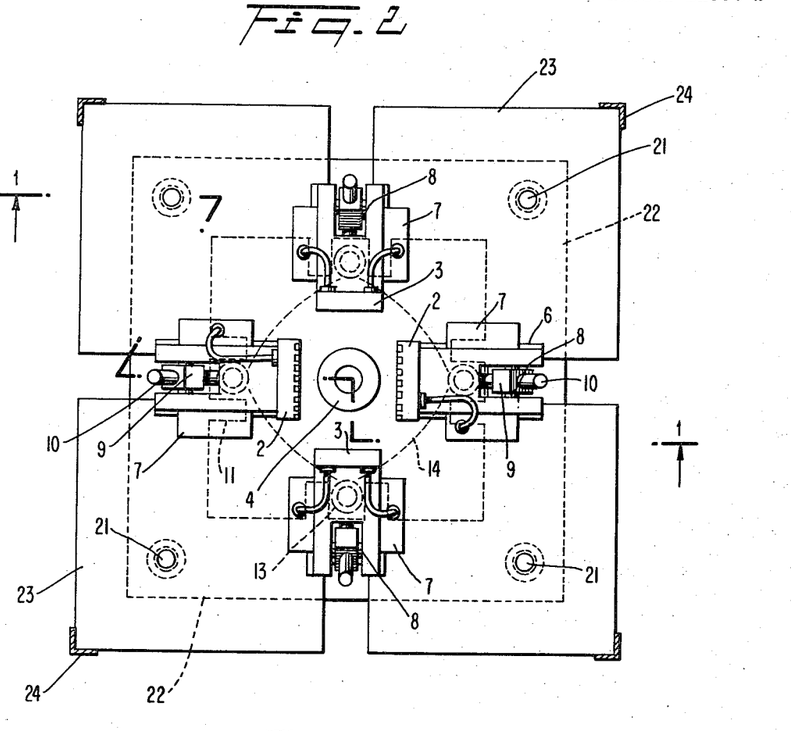
FIG. 2 is a plan view corresponding to FIG. 1, and partly broken away to show details otherwise obscured.

In the embodiment of FIGS. 1 and 2 the apparatus permits the manufacture of articles of square cross section, that is, having four equal sides and meeting edges of slight curvature.

A rotating ring mold 1 having a blowing outlet introduces the prerough into the apparatus. Two rectangular vertical generators of gaseous cushions 2, placed face to face, provided with blowing nozzles separated by evacuation grooves are capable of providing two gaseous cushions directed toward the axis of the bottle to be formed. Perpendicularly and a little behind are two temperature regulators 3, regulated in a manner to assure desired temperature profiles.

During shaping, the rough rests at its lower extremity on a free-turning ring carried by head 4 of jacket 5.

Each of the shapers, that is, generators 2 and regulators 3, is borne by a carrier 6 sliding on slides 7 and articulated at 8 to a sleeve 9 which slides on a lever 10, itself articulated at 11 for oscillation on a support 12 common to all levers 10. Each lever 10 has a roller or cam follower 13 journaled upon its lower end and which are in contact with a cylindrical cam 14 of suitable profile, rotated by principal shaft 15 through clutch-brake 16 on output shaft 17 of a transmission 18 and turning at the same speed as ring mold 1. Springs 19 acting on levers 10 constantly urge each roller 13 into contact with cam 14.

Support 12 is mounted by means of rings 20 forming threaded sleeves on threaded columns 21 turning on platforms 22 and 23 belonging to the frame of the apparatus.

It is possible to rotate columns 21 via secondary shafts such as 25 connected to output shaft 26 of transmission 18, itself driven by one of two plates of reversing clutch 27.

The apparatus also has coolers 28 mounted on jacks 29 and directed to the neck of the bottle being shaped.

This apparatus operates in the following manner:

A prerough or parison suspended from ring mold 1 is rotated and blowing is begun. The base of the rough comes into contact with head 4 of jack 5, which supports it during the rest of the operation. Support 12 is in high position, so that generators 2 and regulators 3 have a mean position close to the axis and take a slight oscillating course which progressively gives the rough, whose rotation is synchronous, a profile still not very far from circular.

When clutch 27 begins to function, and lowers support 12, each shaper comprising collectively a gaseous generator 2 and a corresponding temperature regulator 3, begins to recede from the axis of rotation of head 4, due to the obliquity of its corresponding lever 10, thus accompanying and accommodating the swelling or expansion of the parison. Simultaneously the head 4 of jack 5 is lowered to let the rough elongate. In like manner, the oscillation amplitude or range of radial movement of the shapers increases following due to the change of the lever arm. The profile they mark off approaches progressively the practically square form of the final piece, it being noted from FIG. 2 that cam 14 is generally square in cross section in planes normal to its axis of rotation. The head of the jack 4 finally strikes the upper end plate of cylinder 5, when support 12 is in low position.

When the suitable form and temperature are obtained, coolers 28 are withdrawn and the bottle is disengaged from ring mold 1, while clutch-brake 16 stops rotation of cam 14. Clutch 27 is reversed to return the shapers to an advanced position by rotation of threaded columns 21, and the head 4 of jack 5 returns to its initial position.

The second embodiment as depicted upon FIGS. 3 through 7, also incorporates the features of novelty just described in connection with FIGS. 1 and 2. In addition this second embodiment enables the continuous manufacture of articles, such as bottles, at a high rate of production.

Figure 3:
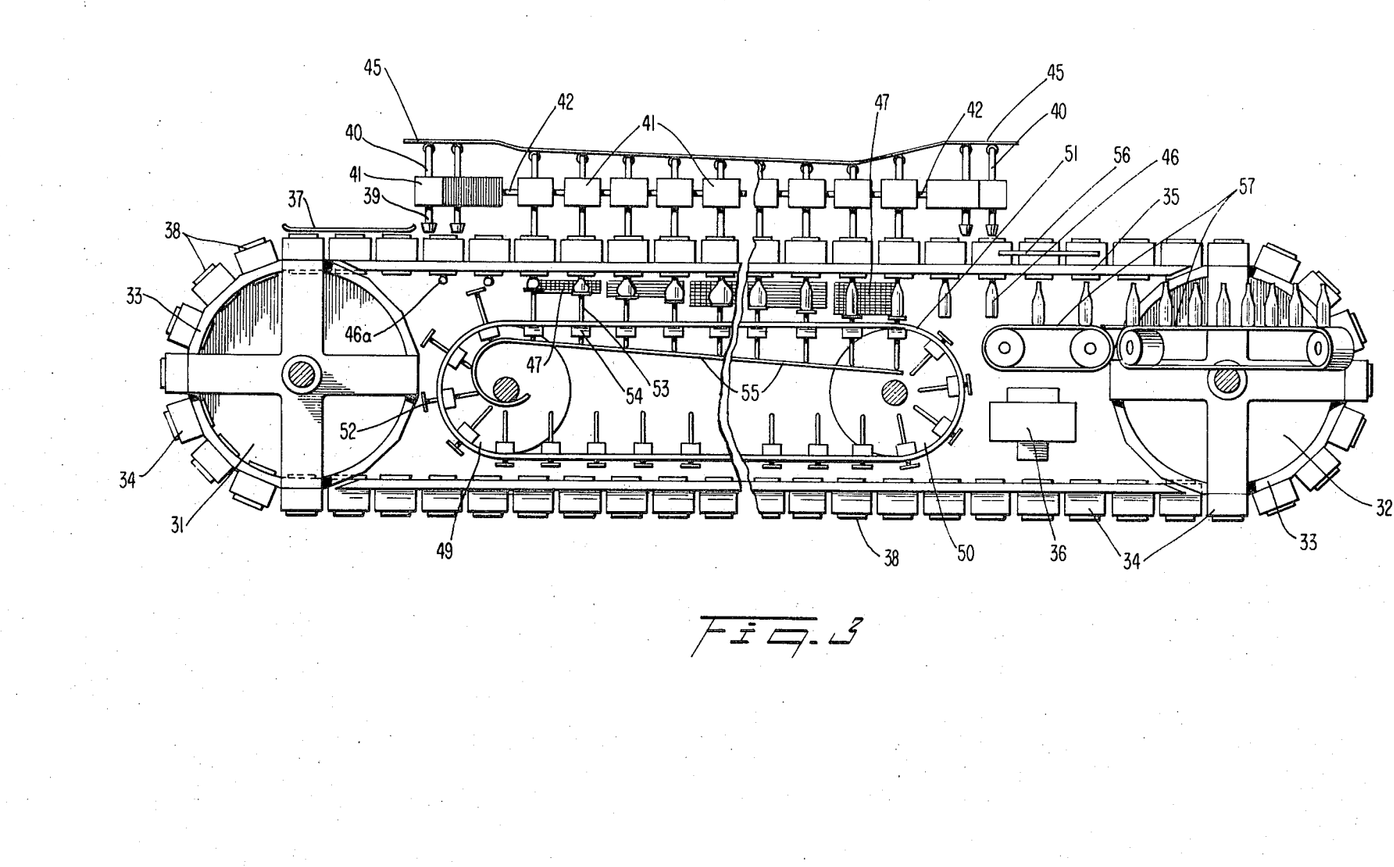
FIG. 3 is an elevational view of an apparatus embodying the invention and capable of the continuous and rapid production of articles such as bottles.

Referring to FIG. 3, two pulleys or sprockets 31, 32, support and drive a chain 33 of ring molds of known type. The molds are guided and rotated along the upper run 35 of chain 33 by a side device not shown. Molds 34 receive for example the parison from a device shown schematically at 36. Cam 37 then causes the descent, then the disappearance of an interior punch 38 intended to mold the ring and form the blowing opening of the prerough. The parison is then blown by blowing tubes 39 applied against the ring molds. Each blowing tube 39 is carried by a respective one of a plurality of rods 40, FIG. 7, each mounted on a respective head 41. The heads are connected in spaced relation to and along a chain 42, FIG. 4, passing about sprockets 43, 44. The chain is driven at the same linear speed as chain 33. As is clear from FIG. 3, cam track 45 engages the upper end of each rod 40 and forces the corresponding blowing tube into pressure-tight engagement with a corresponding ring mold, as each head, with its parison attached, starts its passage between the laterally-spaced rows of shapers, FIG. 6, consisting of gaseous cushion generators 47 and heat-conditioning devices 48, then devices having the effect of progressively assuring the shaping of the roughs during their blowing and of causing them to take the final form, which, in the example represented, is a bottle 46 with a cylindrical body.

A chain 51, FIG. 3, passes about sprockets 49, 50. This chain is driven by means not shown, at the same linear speed as chain 33. Chain 51 has a plurality of carriers 54 fixed thereto in spaced relation along its length. Each carrier mounts a shaft or rod 53 for sliding in the direction perpendicular to the belt, and carries at its outward end a support or plate 52, corresponding to head 4 of FIG. 1. A cam track 55, FIG. 3, is located as shown, beneath the upper horizontal run of belt or chain 51, in position to contact the radially inward ends of those rods 53 instantaneously passing left to right with the aforesaid horizontal run. Cam track 55 is so disposed that at the left end of the run, each support 52 is at a maximum elevation where it contacts and supports the lower end of a respective parison or incipient bottle. As each carrier 54 moves rightwardly with chain 51, cam track 55 allows the corresponding rod 53 to descend gradually, thus accommodating the downward expansion of its parison, while at the same time supporting it continuously at its base or lower end, as is clear from inspection of FIG. 3.

At the discharge end of the upper run 35 of chain 33 a lateral cam 56 opens the sections of the ring mold and thus frees the bottles obtained, which are removed by a carrier 57. The mounting of the blowing heads 41 is shown schematically in FIG. 5. The command rods 40 raised by a spring 58, FIG. 7, and provided with a roller 59 intended to roll on cam 45 in turn support tubes 39 which are pushed down by a second spring 60. Rod 40 likewise carries a light 61 which permits the regulation during the operation of the admission of compressed air provided by piping 62 from wheel 43, modifying the degree of penetration of rod 40 thanks to the action of cam 45. The compression force of spring 60 applies the blowing tubes on the seat of mold 34 as soon as rod 40 is lowered and whatever its exact position.

Figures 4, 6:
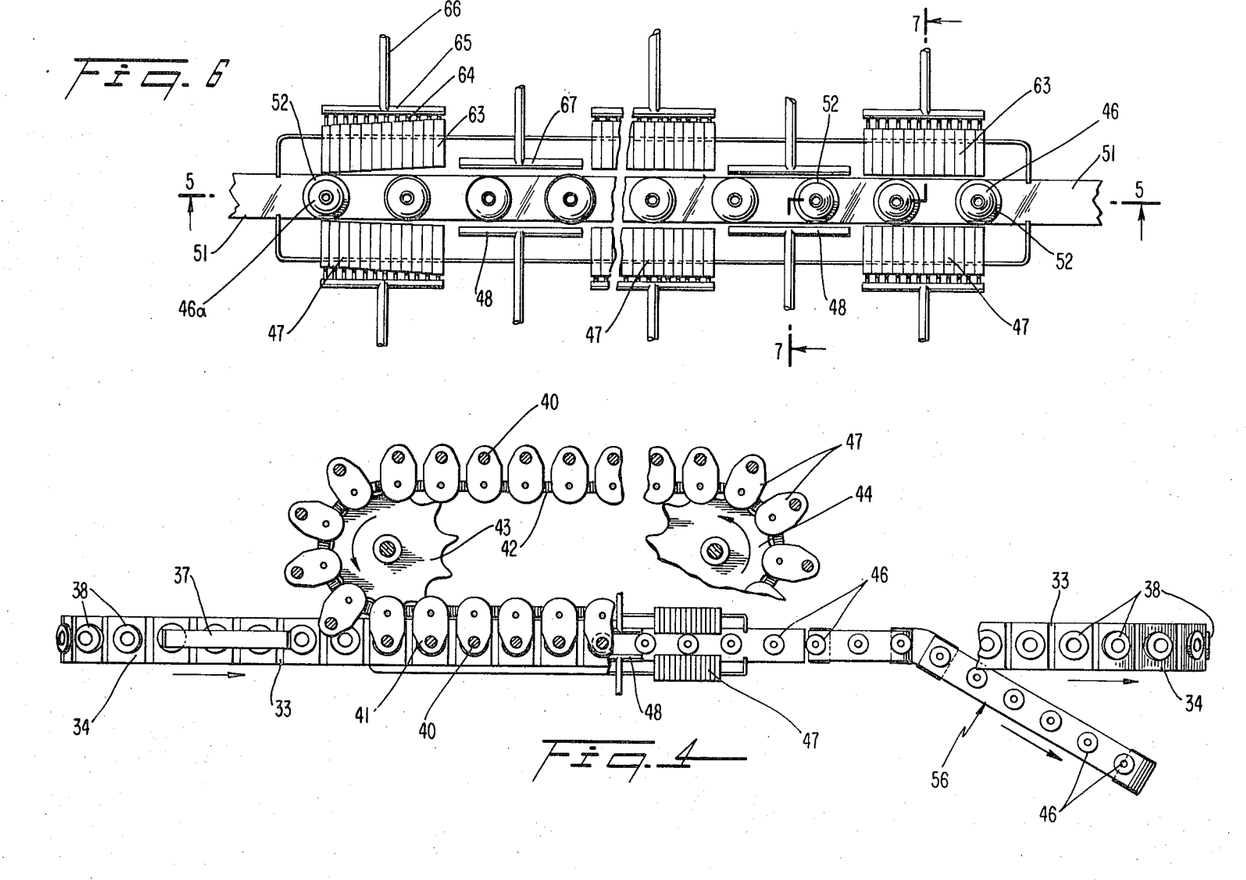
FIG. 4 is a detail plan view of parts of the apparatus of FIG. 3.
FIG. 6 is a horizontal sectional view showing the path of the articles being shaped, between oppositely disposed pairs of gaseous cushion generators, and interposed heat conditioners.
Figure 5:
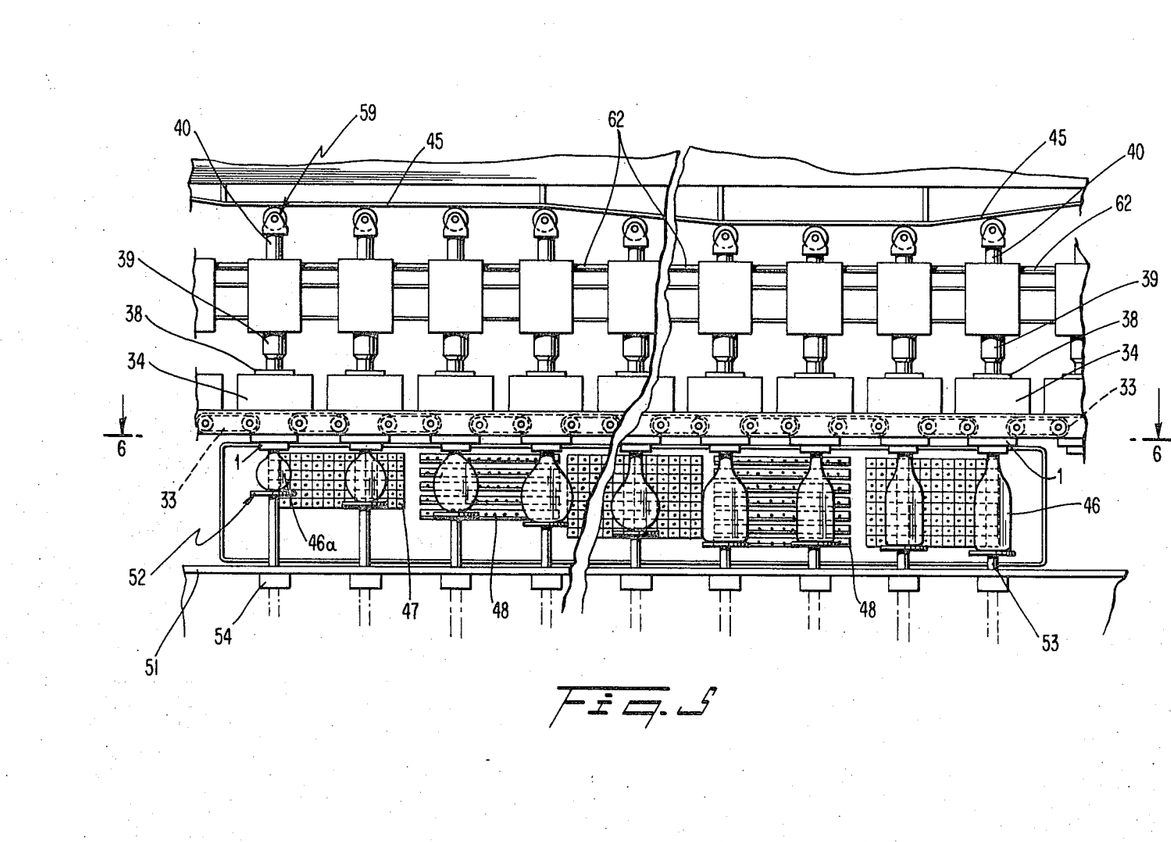
FIG. 5 is a detail sectional view to a scale enlarged over FIG. 3, taken in a plane identified by line V—V, FIG. 6, and showing the mechanism for continuously controlling the blowing tube of each bottle as the latter passes between successive gas generators and heating devices.

The generators 47 of the gaseous cushions, shown in FIGS. 5 to 7 consists of tubular elements 63 provided with an annular blowing orifice and sliding one tubes 64 joined to collectors or plenums 65 fed with air at 66. These different elements can be regulated in their position in such a way as to be able to separate them in a variable manner with reference to the axial plane of the passage that they make up and through which the roughs pass. It is thus possible to give these devices any desired form according to the effect to be exerted on the roughs.

The heat-conditioning devices 48 are themselves made up of tubular elements 67 through which pass independently cooling or heating fluids.

In zones in which intense heat exchange is necessary, they may also consist of burners or blowing devices.

The process of the invention has numerous advantages over those of the art.

The shapers, according to the invention, do not come into direct contact with the glass. It follows that their temperature remains low, which decreases considerably their deterioration and wear as compared with those of a mold; the same is thus true of maintenance expenses and those for renewing equipment. Moreover, the question of heating up molds at the beginning of a run or after a temporary halt does not arise.

Moreover, it has been indicated above that the gaseous-cushion generators may consist of independent parts of small dimensions, the position of which could be regulated within certain limits. This makes it possible to modify their design and to use the same parts to manufacture containers of about the same volume but quite different shapes; the expenses of shut-down, together with the size of the stocks of mold necessary to operate the classical processes, are thus considerably reduced. The totality of these advantages reduces the duration and cost of changeovers, which makes the execution of short runs more economical.

Finally, the very nature of the process makes it possible to observe the rough during the entire operation to detect both anomalies of manufacturing and faults in the system, and particularly to measure the temperature of the glass in each region. This is an important advantage, because it thus becomes much easier to carry out operations, correcting step by step the heat characteristics imposed by the temperature regulators and the form and position of the shapers.

The process of the invention thus has great flexibility, which increases its importance still more. Thus it is possible to obtain much more easily and rapidly phototypes which can be then be improved by progressively modifywhich can then be improved by progressively modifying operation conditions.

Analogously, it is possible, thanks to the progressive or, if desired intermittent, formation made possible by the invention, to combine, with the shaping of the form, reheating, partial tempering, or other treatments such as the application of protective enamels, for example by placing suitable devices in the spaces between the shapers. This makes it possible to carry out these treatments without supplementary machinery and, especially, at suitable chosen temperatures which may be considerably higher than in usual processes in which the article is inaccessible until its skin has acquired sufficient solidity for it not to collapse.

I claim:

1. Apparatus for shaping hollow articles of thermoplastic material comprising a ring mold adapted to support a parison, means to apply pressure fluid to the ring mold to expand a parison of thermoplastic material supported thereon, means to apply a jet of pressure fluid to the exterior of the parison transversely of the axis of the ring mold, and means to effect relative rotation of the ring mold and jet applying means about the axis of the ring mold.

2. Apparatus according to claim 1 wherein said means to effect rotation rotate the ring mold.

3. Apparatus according to claim 2 further including means to translate said ring mold past said jet-applying means.

4. Apparatus according to claim 1 further including means to effect oscillatory motion of said jet-applying means toward and away from the axis of the ring mold at a cyclical rate equal to an integral multiple of the rate of relative rotation of the ring mold and jet-applying means.

5. Apparatus for shaping hollow articles from thermoplastic material comprising a plurality of ring molds, means to move said molds in succession through a closed path, means to deliver parisons of thermoplastic material to said molds, means to rotate said molds during their passage over a portion of said path about substantially vertical axes in which said ring molds are coaxial, means to apply fluid under pressure to said molds during their passage over said portion to expand said parisons to hollow shape, and plural means disposed on opposite sides of said path portion below said ring molds to project streams of gas against said parisons transversely of their axes of rotation as rotated by said rotating means.

6. Apparatus according to claim 5 further including plural heating means disposed on opposite sides of said portion and intercalated with said gas stream projecting means, said heating means effecting heating of the parisons supported on said ring molds.

7. Apparatus according to claim 6 further including means movable in synchronism with said ring molds along said path portion and movable simultaneously transversely of said path portion to limit expansion of said parisons along said axes of rotation.

References Cited
UNITED STATES PATENTS

| | | | |
|---|---|---|---|
| 1,943,195 | 1/1934 | Van Hess | 65—184 |
| 3,340,034 | 9/1967 | Anderson | 65—110 X |
| 2,771,710 | 11/1956 | Molinari et al. | 65—110 X |
| 3,186,819 | 6/1965 | Thorington et al. | 65—285 X |
| 2,633,672 | 4/1953 | Ralston | 65—285 X |

FRANK W. MIGA, Primary Examiner

U.S. Cl. X.R.

65—264, 266, 285, 296, 298

UNITED STATES PATENT OFFICE
CERTIFICATE OF CORRECTION

Patent No. 3,817,737　　　　　　　　Dated　June 18, 1974

Inventor(s)　　　Francois Maurice Hennequin

It is certified that error appears in the above-identified patent and that said Letters Patent are hereby corrected as shown below:

Column 6, line 13, for "jacket" substitute --jack--.

Signed and sealed this 5th day of November 1974.

(SEAL)
Attest:

COY M. GIBSON JR.　　　　　　　　　　　　C. MARSHALL DANN
Attesting Officer　　　　　　　　　　　　Commissioner of Patents